United States Patent
Hays et al.

(10) Patent No.: US 7,953,568 B2
(45) Date of Patent: May 31, 2011

(54) FLOW METER AND METHOD FOR DETECTING A CABLE FAULT IN A CABLING OF THE FLOW METER

(75) Inventors: Paul J. Hays, Lafayette, CO (US); Craig B. McAnally, Thornton, CO (US)

(73) Assignee: Micro Motion, Inc., Boulder, CO (US)

( * ) Notice: Subject to any disclaimer, the term of this patent is extended or adjusted under 35 U.S.C. 154(b) by 174 days.

(21) Appl. No.: 12/279,129

(22) PCT Filed: Feb. 27, 2006

(86) PCT No.: PCT/US2006/006818
§ 371 (c)(1),
(2), (4) Date: Aug. 12, 2008

(87) PCT Pub. No.: WO2007/097760
PCT Pub. Date: Aug. 30, 2007

(65) Prior Publication Data
US 2009/0049928 A1   Feb. 26, 2009

(51) Int. Cl.
G01D 18/00 (2006.01)
G01R 31/00 (2006.01)

(52) U.S. Cl. ............ 702/85; 73/861.354; 701/114; 702/108

(58) Field of Classification Search ............ 702/23, 702/45, 115, 108, 85; 701/114; 73/861.354; 379/22.02; 324/522
See application file for complete search history.

(56) References Cited

U.S. PATENT DOCUMENTS

| | | | |
|---|---|---|---|
| 4,599,696 A | 7/1986 | Takahashi | |
| 4,996,871 A | 3/1991 | Romano | |
| 5,469,748 A | 11/1995 | Kalotay | |
| 5,644,617 A | 7/1997 | Schmidt | |
| 6,487,507 B1 | 11/2002 | Mansfield et al. | |
| 7,694,584 B2 * | 4/2010 | Smith et al. | 73/861.354 |
| 2002/0147561 A1 | 10/2002 | Baracat et al. | |
| 2003/0197513 A1 | 10/2003 | Uematsu et al. | |
| 2007/0186683 A1 | 8/2007 | Smith | |

FOREIGN PATENT DOCUMENTS

| | | |
|---|---|---|
| GB | 1502043 | 2/1978 |
| JP | 3206513 A | 9/1991 |
| JP | 200227182 A | 1/2002 |
| RU | 2159410 C2 | 11/2000 |
| RU | 2358242 C2 | 6/2009 |
| WO | WO-2004/106868 | 12/2004 |
| WO | 2006001805 A1 | 5/2006 |

* cited by examiner

*Primary Examiner* — John H Le
(74) *Attorney, Agent, or Firm* — The Ollila Law Group LLC (57) ABSTRACT

A method for detecting a cable fault in a cabling of a flow meter is provided according to an embodiment of the invention. The method includes testing one or more first pickoff wires and one or more second pickoff wires of the cabling for pickoff open wire faults. The method further includes testing the first pickoff wires and the second pickoff wires for pickoff connection orientation faults if no pickoff open wire faults are determined in the first pickoff wires and the second pickoff wires. The method further includes testing one or more driver wires of the cabling for driver open wire faults. The method further includes testing the driver wires for a driver connection orientation fault if no driver open wire faults are determined in the driver wires.

11 Claims, 8 Drawing Sheets

FLOW METER AND METHOD FOR DETECTING A CABLE FAULT IN A CABLING OF THE FLOW METER

BACKGROUND OF THE INVENTION

1. Field of the Invention

The present invention relates to a flow meter and method for detecting a cable fault in a cabling of the flow meter.

2. Statement of the Problem

Vibrating conduit sensors, such as Coriolis mass flow meters, typically operate by detecting motion of a vibrating conduit that contains a flowing material. Properties associated with the material in the conduit, such as mass flow, density and the like, can be determined by processing measurement signals received from motion transducers associated with the conduit. The vibration modes of the vibrating material-filled system generally are affected by the combined mass, stiffness and damping characteristics of the containing conduit and the material contained therein.

A typical Coriolis mass flow meter includes one or more conduits that are connected inline in a pipeline or other transport system and convey material, e.g., fluids, slurries and the like, in the system. Each conduit may be viewed as having a set of natural vibration modes including, for example, simple bending, torsional, radial, and coupled modes. In a typical Coriolis mass flow measurement application, a conduit is excited in one or more vibration modes as a material flows through the conduit, and motion of the conduit is measured at points spaced along the conduit. Excitation is typically provided by an actuator, e.g., an electromechanical device, such as a voice coil-type driver, that perturbs the conduit in a periodic fashion. Mass flow rate may be determined by measuring time delay or phase differences between motions at the transducer locations. Two such transducers (or pickoff sensors) are typically employed in order to measure a vibrational response of the flow conduit or conduits, and are typically located at positions upstream and downstream of the actuator. The two pickoff sensors are connected to electronic instrumentation by cabling, such as two independent pairs of wires. The instrumentation receives signals from the two pickoff sensors and processes the signals in order to derive a mass flow rate measurement.

When the flow conduit or conduits of a Coriolis flow meter are empty, then the phase difference between the two pickoff signals is ideally zero. In contrast, during normal operation, the flow through the flow meter induces a phase shift between the two pickoff signals due to the Coriolis effect. The phase shift is directly proportional to the material flow through the conduits. Therefore, by making an accurate measurement of the signal difference, the flow meter can accurately measure the mass flow rate.

A Coriolis flow meter typically uses coils to drive a flow conduit(s) and to measure resulting flow conduit vibrations. In many cases, the flow sensor apparatus (i.e., the flow conduit(s), pickoff sensors, and driver), is not integrally mounted with the transmitter electronics. A typical Coriolis meter includes 9 wires bundled in a cable between the transmitter/meter electronics and the flow sensor apparatus. The cabling typically includes 3 wires for a Resistance Temperature Detector (RTD) sensor, 2 wires for a first pickoff sensor, 2 wires for a second pickoff sensor, and 2 wires for a driver.

The cabling is typically connected in the field and by the customer. This can lead to problems in the cabling. Pairs of wires can be swapped. Wires can be mixed up. Bad terminal connections or a failed coil can result in an open circuit. For example, if a first pickoff sensor is connected in a first orientation and the second pickoff sensor is connected in a second, opposite orientation, then a measured phase shift during a zeroing operation will be excessively large. Similarly, where the wires connecting to the driver are switched, then an expected phase characteristic will not be observed and a feedback loop of the driver circuit may drive the response toward zero instead of driving the response to a fundamental frequency.

Another problem that can occur is a broken or unconnected wire between components. A broken or unconnected wire may not be detected until the unit is put into operation. Troubleshooting the problem at the customer's location is costly and time-consuming. In addition, the customer will experience downtime, expense, and frustration.

It is desirable for the transmitter to automatically determine if the sensor is wired correctly, and if not, correct for the encountered problem. Additionally; it is desirable to determine this independently of process variations.

SUMMARY OF THE SOLUTION

Meter electronics for detecting a cable fault in a cabling of a flow meter is provided according to an embodiment of the invention. The meter electronics comprises first and second pickoff sensors and the cabling coupled to the first and second pickoff sensors. The cabling includes one or more first pickoff wires and one or more second pickoff wires. The meter electronics further comprises a signal injection device coupled to the cabling. The signal injection device is configured to generate an injection signal and communicate the injection signal into the cabling and to the first and second pickoff sensors. The meter electronics further comprises a signal conditioning circuit coupled to the cabling. The signal conditioning circuit is configured to receive at least one response signal from at least one of the first and second pickoff sensors in response to the injection signal and determine one or more of a pickoff open wire fault and a pickoff connection orientation fault in one or both of the one or more first pickoff wires and the one or more second pickoff wires of the cabling.

Meter electronics for detecting a cable fault in a cabling of a flow meter is provided according to an embodiment of the invention. The meter electronics comprises a driver, first and second pickoff sensors, and the cabling coupled to the first and second pickoff sensors and to the driver. The meter electronics further comprises a driver circuit coupled to the cabling and configured to generate a drive signal and communicate the drive signal into the cabling and to the driver. The meter electronics further comprises a signal conditioning circuit coupled to the cabling. The signal conditioning circuit is configured to receive at least one response signal from at least one of the first and second pickoff sensors in response to the drive signal and determine one or more of a driver open wire fault and a driver connection orientation fault in one or more driver wires of the cabling.

A method for detecting a cable fault in a cabling of a flow meter is provided according to an embodiment of the invention. The method comprises comparing an injection signal component of a response signal received from at least one of a first pickoff sensor and a second pickoff sensor to a predetermined pickoff amplitude threshold and determining a pickoff open wire fault in a corresponding one or more first pickoff wires or in a corresponding one or more second pickoff wires if the injection signal component does not exceed the predetermined pickoff amplitude threshold.

A method for detecting a cable fault in a cabling of a flow meter is provided according to an embodiment of the invention. The method comprises comparing a phase difference between a first pickoff response phase of a first pickoff response signal and a second pickoff response phase of a second pickoff response signal to a predetermined pickoff phase difference threshold. The first pickoff response signal and the second pickoff response signal are received from the first pickoff sensor and the second pickoff sensor via the cabling. The method further comprises determining a pickoff connection orientation fault if the phase difference exceeds the predetermined pickoff phase difference threshold.

A method for detecting a cable fault in a cabling of a flow meter is provided according to an embodiment of the invention. The method comprises comparing a drive resistor voltage across a drive resistor $R_D$ at an output of the driver circuit to a predetermined voltage threshold and determining a driver open wire fault in the one or more driver wires if the drive resistor voltage does not exceed the predetermined voltage threshold.

A method for detecting a cable fault in a cabling of a flow meter is provided according to an embodiment of the invention. The method comprises comparing a response signal phase difference to a predetermined driver phase difference threshold. The response signal phase difference comprises a difference between a response signal phase and a drive signal phase. The response signal phase is received from at least one of a first pickoff sensor and a second pickoff sensor. The method further comprises determining a driver connection orientation fault in the one or more driver wires if the response signal phase difference exceeds the predetermined driver phase difference threshold.

A method for detecting a cable fault in a cabling of a flow meter is provided according to an embodiment of the invention. The method comprises determining a vibrational response amplitude of a vibrational response and determining a driver connection orientation fault in the one or more driver wires if the vibrational response amplitude does not substantially track a drive signal amplitude.

A method for detecting a cable fault in a cabling of a flow meter is provided according to an embodiment of the invention. The method comprises testing one or more first pickoff wires and one or more second pickoff wires of the cabling for pickoff open wire faults. The one or more first pickoff wires and the one or more second pickoff wires are included in the cabling and connect to a first pickoff sensor and to a second pickoff sensor respectively. The method further comprises testing the one or more first pickoff wires and the one or more second pickoff wires for a pickoff connection orientation fault if no pickoff open wire faults are determined in the one or more first pickoff wires and the one or more second pickoff wires. The method further comprises testing one or more driver wires of the cabling for a driver open wire fault. The one or more driver wires connect to a driver. The method further comprises testing the one or more driver wires for a driver connection orientation fault if no driver open wire faults are determined in the one or more driver wires.

Aspects

In one aspect of the meter electronics, the signal conditioning circuit is configured to compare an injection signal component of the at least one response signal to a predetermined pickoff amplitude threshold and determine a pickoff open wire fault in the corresponding one or more first pickoff wires or in the corresponding one or more second pickoff wires if the injection signal component does not exceed the predetermined pickoff amplitude threshold.

In another aspect of the meter electronics, the signal conditioning circuit receives a first pickoff response signal and a second pickoff response signal and the signal conditioning circuit is configured to compare a phase difference between a first pickoff response phase and a second pickoff response phase to a predetermined pickoff phase difference threshold and determine a pickoff connection orientation fault in the corresponding one or more first pickoff wires or in the corresponding one or more second pickoff wires if the phase difference exceeds the predetermined pickoff phase difference threshold.

In yet another aspect of the meter electronics, the signal injection device comprises a digital-to-analog (D/A) converter configured to receive a digital frequency command and output a frequency input, an injection signal generator that receives the frequency input from the D/A converter and outputs an injection signal of a frequency specified by the frequency input, and a transformer that communicates the injection signal into the cabling.

In yet another aspect of the meter electronics, the signal conditioning circuit is further configured to invert a received response signal from one pickoff sensor if a pickoff connection orientation fault is determined to exist.

In yet another aspect of the meter electronics, the signal conditioning circuit is configured to compare a drive resistor voltage across a drive resistor $R_D$ at an output of the driver circuit to a predetermined voltage threshold and determine a driver open wire fault in the one or more driver wires if the drive resistor voltage does not exceed the predetermined voltage threshold.

In yet another aspect of the meter electronics, the signal conditioning circuit is configured to compare a response signal phase difference to a predetermined driver phase difference threshold and determine a driver connection orientation fault in the one or more driver wires if the response signal phase difference exceeds the predetermined driver phase difference threshold, with the response signal phase difference comprising a difference between a response signal phase and a drive signal phase and with the response signal phase being received from at least one of the first pickoff sensor and the second pickoff sensor.

In yet another aspect of the meter electronics, the meter electronics is further configured to determine a vibrational response amplitude of a vibrational response and determine a driver connection orientation fault in the one or more driver wires if the vibrational response amplitude does not substantially track a drive signal amplitude.

In yet another aspect of the meter electronics, the driver circuit is further configured to invert a drive signal if the driver connection orientation fault is determined to exist.

In one embodiment of the method, the method further comprises generating an alarm if the pickoff open wire fault is determined to exist.

In another embodiment of the method, the comparing and determining further comprise comparing a first injection signal component of a first response signal from the first pickoff sensor to the predetermined pickoff amplitude threshold, determining a first pickoff open wire fault in the one or more first pickoff wires if the first injection signal component does not exceed the predetermined pickoff amplitude threshold, comparing a second injection signal component of a second response signal from the second pickoff sensor to the predetermined pickoff amplitude threshold, and determining a second pickoff open wire fault in the one or more second pickoff wires if the second injection signal component does not exceed the predetermined pickoff amplitude threshold.

In yet another embodiment of the method, the method further comprises generating an alarm if the pickoff connection orientation fault is determined to exist.

In yet another embodiment of the method, the method further comprises, after the determining, inverting a received response signal from one pickoff sensor if a pickoff connection orientation fault is determined to exist.

In yet another embodiment of the method, the method further comprises generating an alarm if the driver open wire fault is determined to exist.

In yet another embodiment of the method, the method further comprises generating an alarm if the driver connection orientation fault is determined to exist.

In yet another embodiment of the method, the method further comprises, after the determining, inverting a drive signal from the driver circuit if the driver connection orientation fault is determined to exist.

In yet another embodiment of the method, the method further comprises generating an alarm if the driver connection orientation fault is determined to exist.

In yet another embodiment of the method, the method further comprises, after the determining, inverting a drive signal from the driver circuit if the driver connection orientation fault is determined to exist.

In yet another embodiment of the method, the method further comprises generating an alarm if an open wire fault is determined to exist in the one or more first pickoff wires, in the one or more second pickoff wires, or in the one or more driver wires.

In yet another embodiment of the method, the method further comprises generating an alarm if a connection orientation fault is determined to exist in the one or more first pickoff wires, in the one or more second pickoff wires, or in the one or more driver wires.

In yet another embodiment of the method, the testing the one or more pickoff sensors for pickoff open wire faults comprises comparing an injection signal component of a response signal received from at least one of the first pickoff sensor and the second pickoff sensor to a predetermined pickoff amplitude threshold and determining a pickoff open wire fault in a corresponding one or more first pickoff wires or in a corresponding one or more second pickoff wires if the injection signal component does not exceed the predetermined pickoff amplitude threshold.

In yet another embodiment of the method, testing the one or more first pickoff wires and the one or more second pickoff wires for pickoff connection orientation faults comprises comparing a phase difference between a first pickoff response phase of a first pickoff response signal and a second pickoff response phase of a second pickoff response signal to a predetermined pickoff phase difference threshold, with the first pickoff response signal and the second pickoff response signal being received from the first pickoff sensor and the second pickoff sensor via the cabling, and determining a pickoff connection orientation fault if the phase difference exceeds the predetermined pickoff phase difference threshold.

In yet another embodiment of the method, the method further comprises, after testing for the pickoff connection orientation fault, inverting the response signal from one pickoff sensor if a pickoff connection orientation fault is determined to exist.

In yet another embodiment of the method, testing the driver for open wires comprises comparing a drive resistor voltage across a drive resistor $R_D$ at an output of the driver circuit to a predetermined voltage threshold and determining a driver open wire fault in the one or more driver wires if the drive resistor voltage does not exceed the predetermined voltage threshold.

In yet another embodiment of the method, testing the one or more driver wires for a driver connection orientation fault comprises comparing a response signal phase difference to a predetermined driver phase difference threshold, with the response signal phase difference comprising a difference between a response signal phase and a drive signal phase and with the response signal phase being received from at least one of the first pickoff sensor and the second pickoff sensor, and determining a driver connection orientation fault in the one or more driver wires if the response signal phase difference exceeds the predetermined driver phase difference threshold.

In yet another embodiment of the method, testing the one or more driver wires for a driver connection orientation fault comprises determining a vibrational response amplitude of a vibrational response and determining a driver connection orientation fault in the one or more driver wires if the vibrational response amplitude does not substantially track a drive signal amplitude.

In yet another embodiment of the method, the method further comprises, after testing the one or more driver wires for the driver connection orientation fault, inverting the drive signal from the driver if the driver connection orientation fault is determined to exist.

DETAILED DESCRIPTION OF THE INVENTION

FIGS. 1-8 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
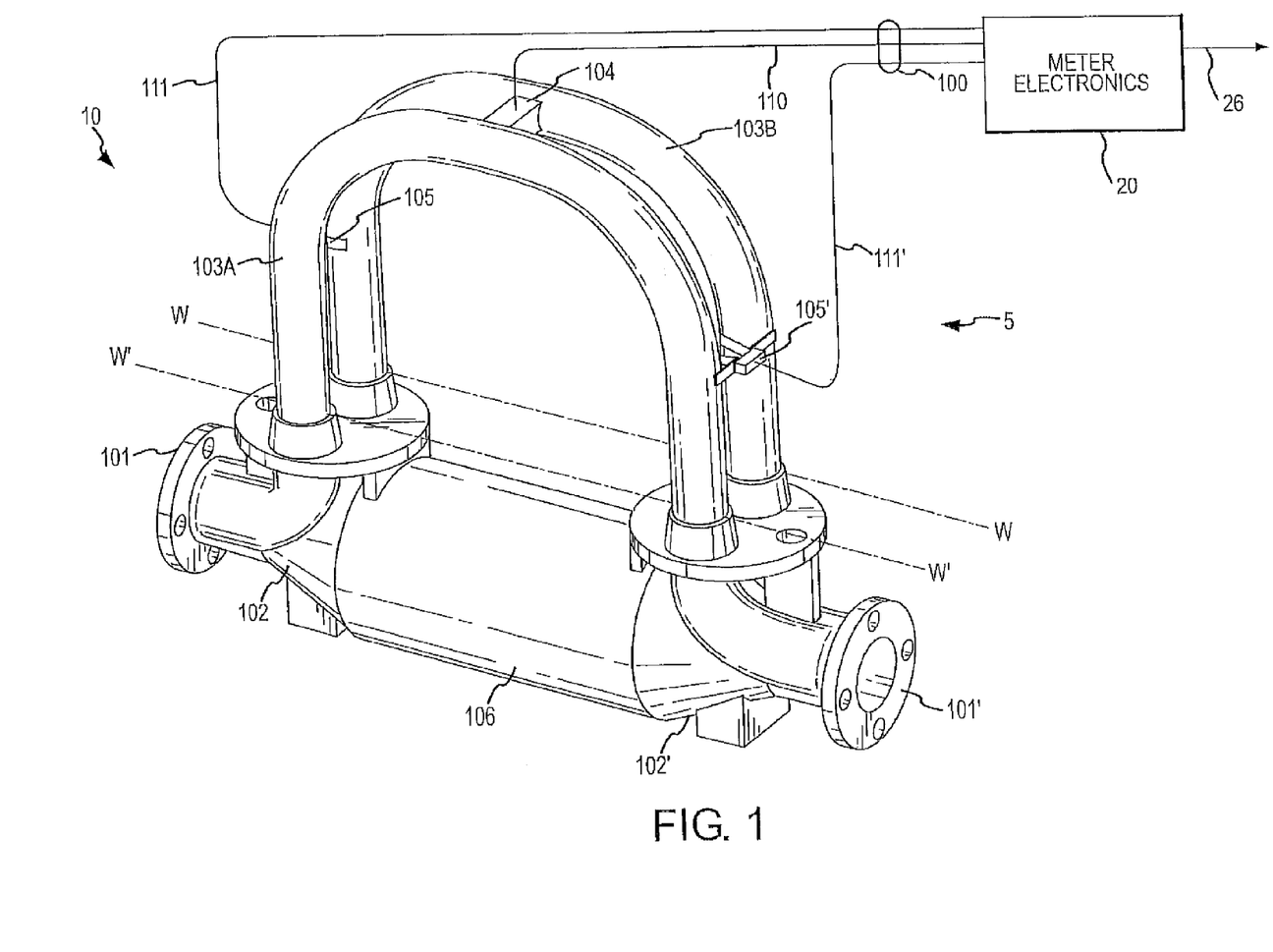
FIG. 1 illustrates a Coriolis flow meter comprising a flow meter assembly and meter electronics.

FIG. 1 illustrates a Coriolis flow meter 5 comprising a flow meter assembly 10 and meter electronics 20. Meter electronics 20 is connected to meter assembly 10 via leads 100 to provide density, mass flow rate, volume flow rate, totalized mass flow, temperature, and other information over path 26. It should be apparent to those skilled in the art that the present invention can be used by any type of Coriolis flow meter regardless of the number of drivers, pickoff sensors, flow conduits, or the operating mode of vibration. A Coriolis flow meter structure is described although it is apparent to those skilled in the art that the present invention could be practiced as a vibrating tube densitometer without the additional measurement capability provided by a Coriolis mass flow meter.

Flow meter assembly 10 includes a pair of flanges 101 and 101', manifolds 102 and 102', driver 104, pickoff sensors 105-105', and flow conduits 103A and 103B. Driver 104 and pickoff sensors 105 and 105' are connected to flow conduits 103A and 103B.

Flanges 101 and 101' are affixed to manifolds 102 and 102'. Manifolds 102 and 102' are affixed to opposite ends of spacer 106. Spacer 106 maintains the spacing between manifolds 102 and 102' to prevent undesired vibrations in flow conduits 103A and 103B. When flow meter assembly 10 is inserted into a pipeline system (not shown) which carries the material being measured, material enters flow meter assembly 10 through flange 101, passes through inlet manifold 102 where the total amount of material is directed to enter flow conduits 103A and 103B, flows through flow conduits 103A and 103B and back into outlet manifold 102' where it exits meter assembly 10 through flange 101'.

Flow conduits 103A and 103B are selected and appropriately mounted to inlet manifold 102 and outlet manifold 102' so as to have substantially the same mass distribution, moments of inertia, and elastic modules about bending axes W-W and W'-W' respectively. The flow conduits extend outwardly from the manifolds in an essentially parallel fashion.

Flow conduits 103A-B are driven by driver 104 in opposite directions about their respective bending axes W and W' and at what is termed the first out of bending mode of the flow meter. Driver 104 may comprise one of many well known arrangements, such as a magnet mounted to flow conduit 103A and an opposing coil mounted to flow conduit 103B. An alternating current is passed through the opposing coil to cause both conduits to oscillate. A suitable drive signal is applied by meter electronics 20, via lead 110 to driver 104.

Meter electronics 20 receives sensor signals on leads 111 and 111', respectively. Meter electronics 20 produces a drive signal on lead 110 which causes driver 104 to oscillate flow conduits 103A and 103B. Meter electronics 20 processes left and right velocity signals from pickoff sensors 105 and 105' in order to compute a mass flow rate. Path 26 provides an input and an output means that allows meter electronics 20 to interface with an operator. The description of FIG. 1 is provided merely as an example of the operation of a flow meter and is not intended to limit the teaching of the present invention.

Figure 2:
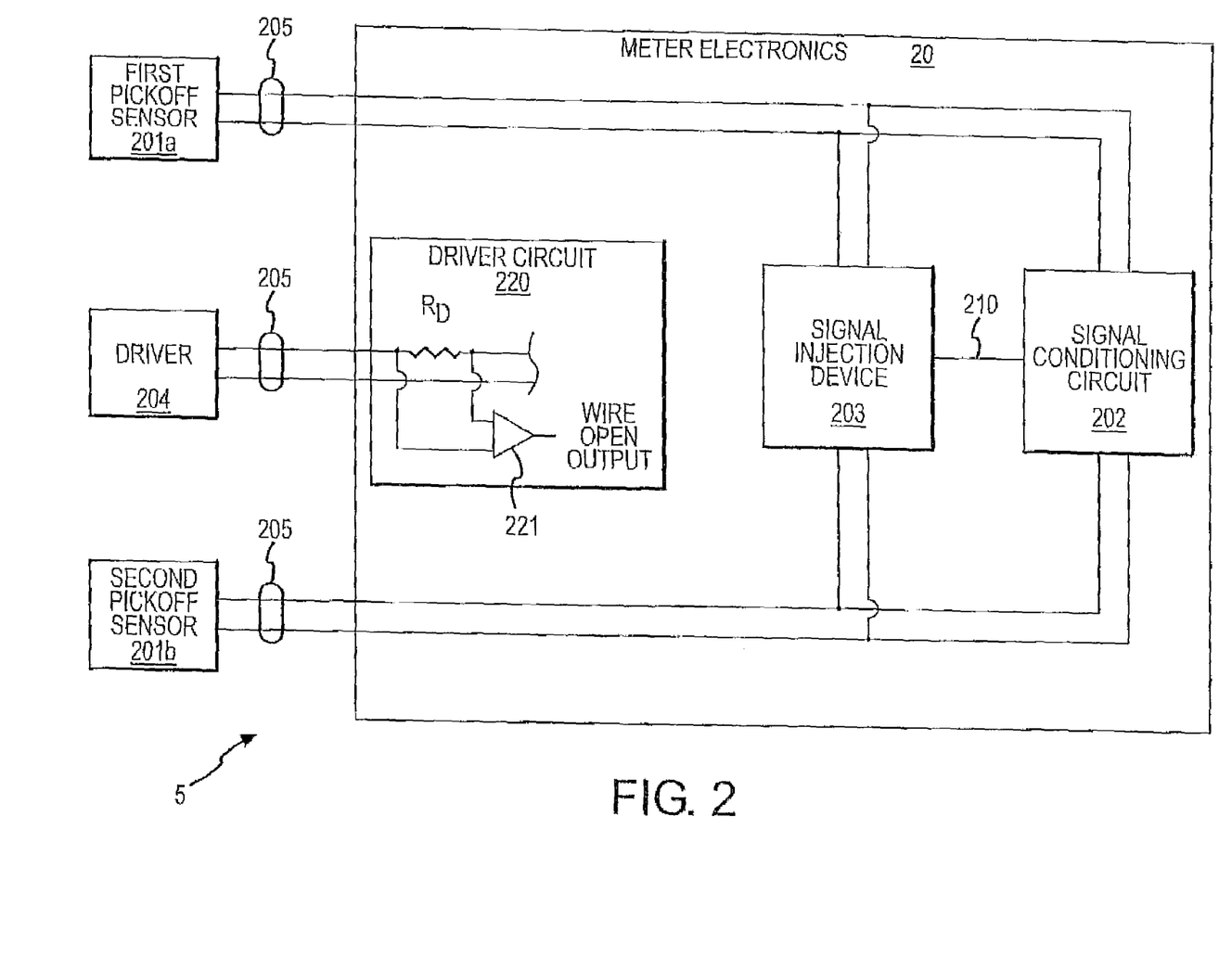
FIG. 2 is a diagram of a portion of the flow meter according to an embodiment of the invention.

FIG. 2 is a diagram of a portion of the flow meter 5 according to an embodiment of the invention. The flow meter 5 includes a first pickoff sensor 201a, a second pickoff sensor 201b, a driver 204, and the meter electronics 20. The meter electronics 20 can operate as a mass flow meter or can operate as a densitometer, including operating as a Coriolis flow meter. The meter electronics 20 can include, among other things, a driver circuit 220, a signal injection device 203, and a signal conditioning circuit 202. The meter electronics 20 is connected to the pickoff sensors 201 and to the driver 204 by cabling 205. The cabling 205 connects the first pickoff sensor 201a and the second pickoff sensor 201b to a signal conditioning circuit 202 and to a signal injection device 203. The cabling 205 connects the driver 204 to the driver circuit 220. In one embodiment, the signal conditioning circuit 202 and the signal injection device 203 are interconnected by a link 210.

The cabling 205 can comprise any manner of wires, cables, fibers, etc., that electrically connect the first and second pickoff sensors 201a and 201b to the signal conditioning circuit 202. The cabling 205 in one embodiment comprises at least a portion of the leads 100 of FIG. 1.

A typical flow meter includes 9 wires bundled in the cabling 205 between the transmitter/meter electronics 20 and the flow meter assembly 10. The cabling 205 typically includes 3 wires for a Resistance Temperature Detector (RTD) sensor, 2 wires for a first pickoff sensor, 2 wires for a second pickoff sensor, and 2 wires for the driver.

The meter electronics 20 in one embodiment can perform cable fault determinations for the cabling 205 between the meter electronics 20 and the pickoff sensors 201a and 201b. The meter electronics 20 in one embodiment can perform cable fault determinations for the cabling 205 between the meter electronics 20 and the driver 204.

The driver circuit 220 generates a drive signal and communicates the drive signal to the driver 204. The driver 204 vibrates the flow conduits 103A and 103B according to the drive signal. The drive signal therefore includes an amplitude characteristic and a frequency characteristic. Where the meter electronics 20 implements a closed-loop drive, a difference between a drive signal and a response signal is employed as feedback for modifying the drive signal. For example, a phase difference between the drive signal and a response signal can comprise the feedback. Ideally, under no-flow conditions the phase difference will be substantially zero if the flow meter is accurately calibrated.

The driver circuit 220 can generate a drive signal. The drive signal in one embodiment comprises an operational drive signal that is generated by the driver circuit 220, wherein the signal vibrates a flow conduit(s) 103. A resulting response signal to the drive signal can be received in the signal conditioning circuit 202. Alternatively, the drive signal can be generated specifically for a fault test according to the invention.

The signal injection device 203 can generate an injection signal and can communicate the injection signal to one or both of the first pickoff sensor 201a and the second pickoff sensor 201b via the cabling 205. The signal injection device 203 can generate an injection signal according to an injection signal command that can be received from the signal conditioning circuit 202 over the link 210. The injection signal can comprise any desired frequency or frequencies. The injection signal can include frequencies above, below, or the same as a drive signal.

The signal conditioning circuit 202 receives response signals from both pickoff sensors 201a and 201b. The signal conditioning circuit 202 can detect and/or process the response signals. The signal conditioning circuit 202 can process the response signals in order to produce appropriate flow measurements. In addition, the signal conditioning circuit 202 can process the response signals in order to detect faults in the cabling 205 according to embodiments of the invention.

The response signals can be generated by the pickoff sensors 201 according to normal operation of the flow meter 5. Alternatively, the response signals can be generated by the pickoff sensors 201 in response to any manner of test vibration of the flow conduits 103. In yet another alternative, the response signals can be generated by the pickoff sensor 201 in response to an injection signal from the signal injection device 203.

The signal conditioning circuit 202 can determine a response signal amplitude for each pickoff sensor. The signal conditioning circuit 202 can determine a phase difference between the response signals received from the first pickoff sensor 201a and the second pickoff sensor 201b. The amplitude and phase difference can be used to determine a connection orientation faults in the cabling 205.

In one embodiment, the meter electronics 20 can include a processor (not shown) and a cable troubleshooting software routine. The processor can execute the cable troubleshooting software routine and can initiate and supervise open wire and connection orientation fault determinations for the cabling 205. The processor and cable troubleshooting software routine can initiate signals into the pickoff sensors 201a and 201b. The processor and routine can receive measurements/data from the open wire and connection orientation fault tests and can perform appropriate fault determinations. The processor and routine can generate alarms if problems are detected. In addition, the processor and routine can perform compensation techniques, including inverting signals or signal responses in order to compensate for improper wiring orientations. Alternatively, the signal conditioning circuit 202, the signal injection device 203, the driver circuit 220, and the processor can include equivalent circuitry and/or specialized circuit components that perform the above operations.

Figure 3:
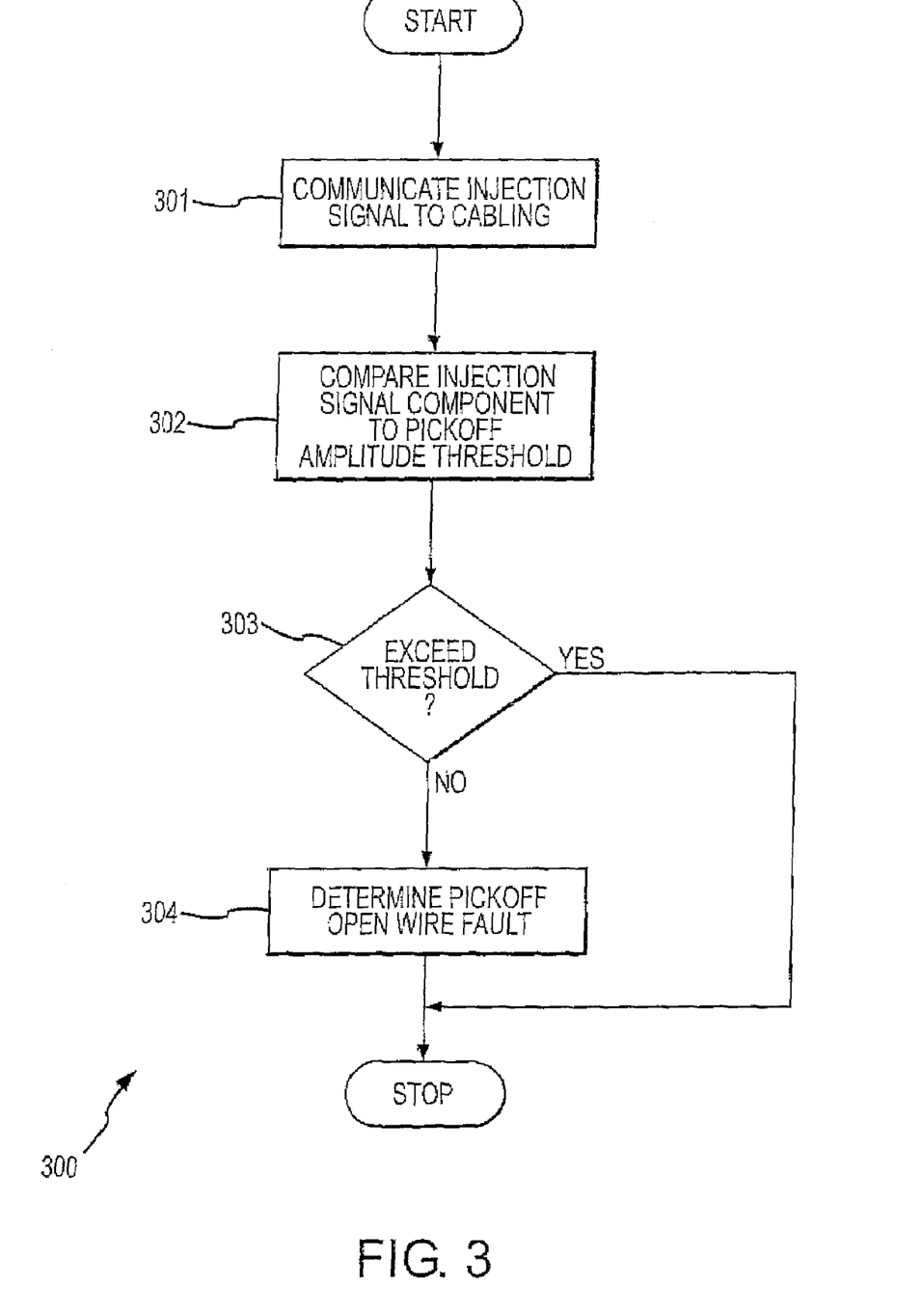
FIG. 3 is a flowchart of a method for detecting a cable fault in a cabling of a flow meter according to an embodiment of the invention.

FIG. 3 is a flowchart 300 of a method for detecting a cable fault in a cabling of a flow meter according to an embodiment of the invention. In this method, a pickoff open wire fault determination is performed. The pickoff open wire fault test can detect open wire faults such as a wire break or an unconnected wire in corresponding pickoff wires of the cabling 205.

In step 301, an injection signal is communicated into one or more pickoff wires of the cabling 205. As a result, the injection signal is communicated to at least one of the first pickoff sensor 201a and the second pickoff sensor 201b. The injection signal can be generated by the signal injection device 203, for example. When an injection signal is generated by the signal injection device 203, the signal conditioning circuit 202 should substantially simultaneously receive response signals from both pickoff sensors 201a and 201b.

In step 302, a response signal is compared to a predetermined pickoff amplitude threshold. The injection signal sent to the pickoff sensor 201 will generate two different, returning signals to the signal conditioning circuit 202, but only if the pickoff wires are not open. The first signal, an injection signal component, is a reflection of the injection signal and is at substantially the same frequency as the injection signal. If the pickoff wires are not open, then this injection signal component should be similar in amplitude to the injection signal and therefore can be compared to a threshold. The second signal is a response signal component and differs in frequency from the original injection signal due to the effects of vibration of the flow conduit(s) 103 and due to the effects of a flow material in the flow conduit(s) 103. However, this response signal component may vary in amplitude and may be undetectable in some cases. Therefore, in one embodiment, the injection signal component of the response signal is used for the comparing.

In step 303, if the injection signal component does not exceed the predetermined pickoff amplitude threshold, then the method proceeds to step 304. Here, it is determined that a response signal was not received and that a wire of the corresponding pickoff sensor is either broken or not connected. Otherwise, if the injection signal component does exceed the predetermined pickoff amplitude threshold, then the method branches around step 304. Therefore, it is determined that a response signal was received and that the corresponding pickoff wires are not broken or disconnected.

In step 304, because the injection signal component did not exceed the predetermined pickoff amplitude threshold, the corresponding pickoff wires are determined to have an open wire fault. Subsequently, the meter electronics 20 can perform other actions, including generating an alarm that indicates the open wire fault.

The above steps are discussed in the context of a single pickoff sensor and a single response signal amplitude. However, it should be understood that the steps 302-304 can be performed on the response signals from both pickoff sensors 201a and 201b.

Figure 4:
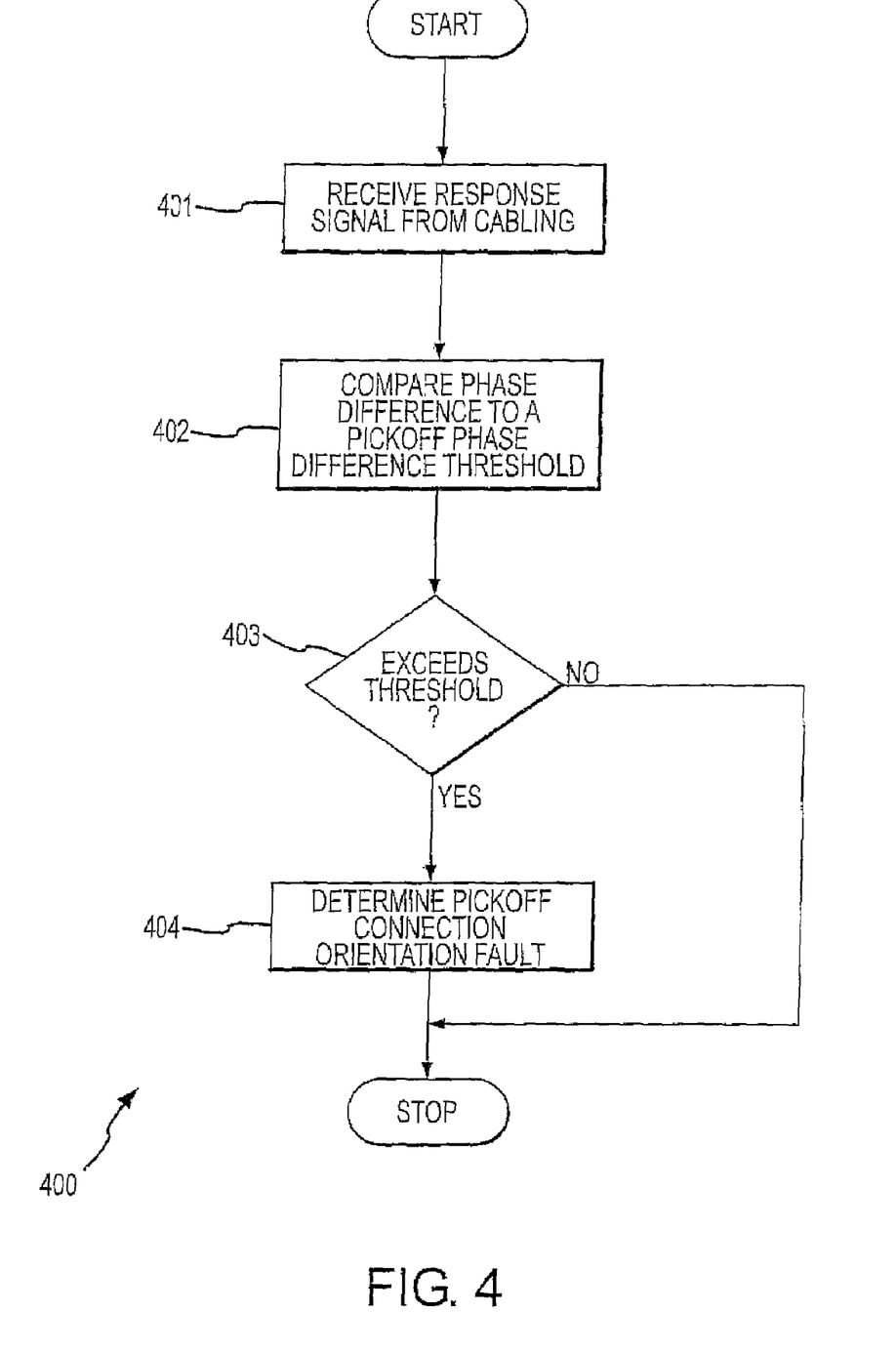
FIG. 4 is a flowchart of a method for detecting a cable fault in a cabling of a flow meter according to an embodiment of the invention.

FIG. 4 is a flowchart 400 of a method for detecting a cable fault in a cabling of a flow meter according to an embodiment of the invention. In this method, a pickoff sensor connection orientation fault determination is performed.

In step 401, a response signal is received from one or both pickoff sensors via the cabling 205 in response to a drive signal applied by the driver 204.

Under no-flow conditions in the flow meter 5, the phase difference between the left and right (or first and second) pickoff signals will be substantially zero. Under flow conditions, the phase of the first pickoff signal will differ from the phase of the second pickoff signal by a relatively small amount, according to a mass flow rate of flow material through the flow meter 5. However, if the phase difference between the two pickoff signals is too great, then a connection orientation fault exists.

In step 402, a phase difference is compared to a predetermined pickoff phase difference threshold. The phase difference comprises a difference between a response signal phase and a drive signal phase.

In step 403, if the phase difference exceeds the predetermined pickoff phase difference threshold, then the method proceeds to step 404. If the phase difference does not exceed the predetermined pickoff phase difference threshold, then the method branches around step 404.

In step 404, because the phase difference exceeded the predetermined pickoff phase difference threshold, then it is determined that a connection orientation fault exists in corresponding pickoff wires. For example, the two response signals can be around 180 degrees out of phase, plus or minus a relatively small phase difference portion caused by a response to a flow material in the flow conduit(s) 103. As before, an alarm condition can be generated if the connection orientation fault is determined to exist. In addition, the meter electronics 20 can invert all subsequent response signals received from the affected pickoff sensor. In this manner, the improper connection orientation can be remediated.

The above steps are discussed in the context of a single pickoff sensor and a single phase difference. However, it should be understood that the steps 402-404 can be performed on the response signals from both pickoff sensors 201a and 201b.

Figure 5:
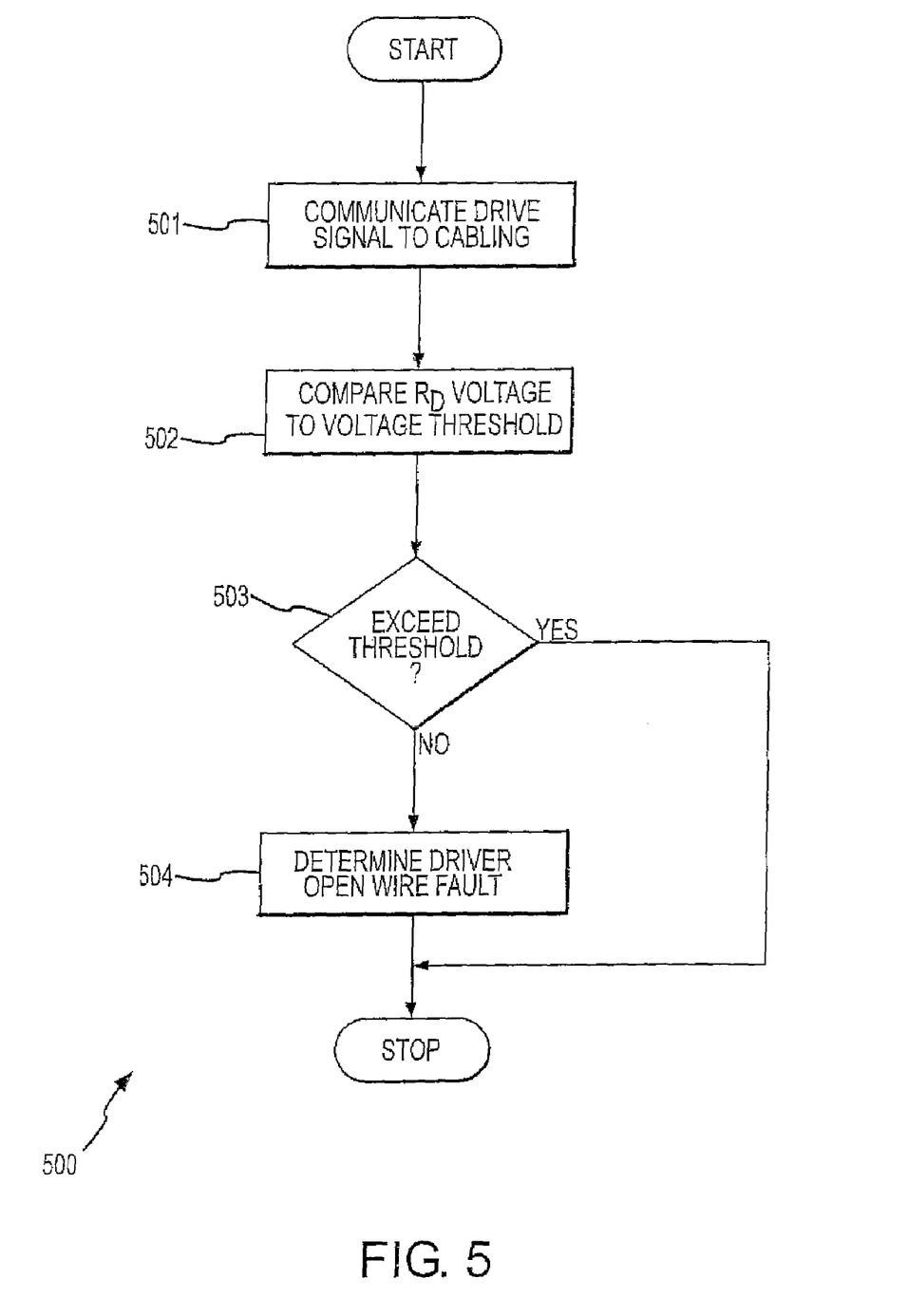
FIG. 5 is a flowchart of a method for detecting a cable fault in a cabling of a flow meter according to an embodiment of the invention.

FIG. 5 is a flowchart 500 of a method for detecting a cable fault in a cabling 205 of a flow meter according to an embodiment of the invention. In this method, a driver open wire fault determination is performed. The driver open wire fault test can detect open wire faults such as a wire break or an unconnected wire.

In step 501, a drive signal is communicated into one or more driver wires of the cabling 205 and to the driver 204. The drive signal can be generated by the driver circuit 220, as previously discussed. The drive signal can comprise a normal operational drive signal or can comprise any generated signal that is suitable for the wire open fault testing.

Referring back to FIG. 2, the driver circuit 220 includes a drive resistor $R_D$ in the output. An op-amp 221 is connected across the drive resistor $R_D$. In one embodiment, the op-amp 221 amplifies a voltage across the drive resistor $R_D$ and outputs a drive resistor voltage. The drive resistor voltage can comprise an analog voltage signal that can be compared to a predetermined voltage threshold.

Referring again to FIG. 5, in step 502 the drive resistor voltage across the drive resistor $R_D$ is compared to a predetermined voltage threshold. If the drive resistor voltage at the output of the op-amp 221 exceeds the predetermined voltage threshold, then an expected level of electrical current is flowing through the cabling 205 to the driver 204.

In step 503, if the drive resistor voltage does not exceed the predetermined voltage threshold, then the method proceeds to step 504. Otherwise, if the drive resistor voltage exceeds the predetermined voltage threshold, then it can be determined that no open wire condition exists and therefore the method branches around step 504.

In step 504, because the drive resistor voltage did not exceed the predetermined voltage threshold, then it can be determined that a driver open wire fault condition exists in the cabling 205 to the driver 204. This step can include generating an alarm condition, as previously discussed.

Alternatively, the op-amp 221 can comprise a comparator device that compares the voltage at the cabling side of the drive resistor $R_D$ to a voltage (i.e., to the predetermined voltage threshold) and generates a digital true or false output. The digital output therefore comprises a first digital output level if the drive resistor voltage exceeds the predetermined voltage and a second digital output level if the drive resistor voltage does not exceed the predetermined voltage. The comparison of step 502 therefore can comprise a comparison internal to the comparator device, wherein the predetermined voltage threshold comprises a voltage input to the comparator device.

Figure 6:
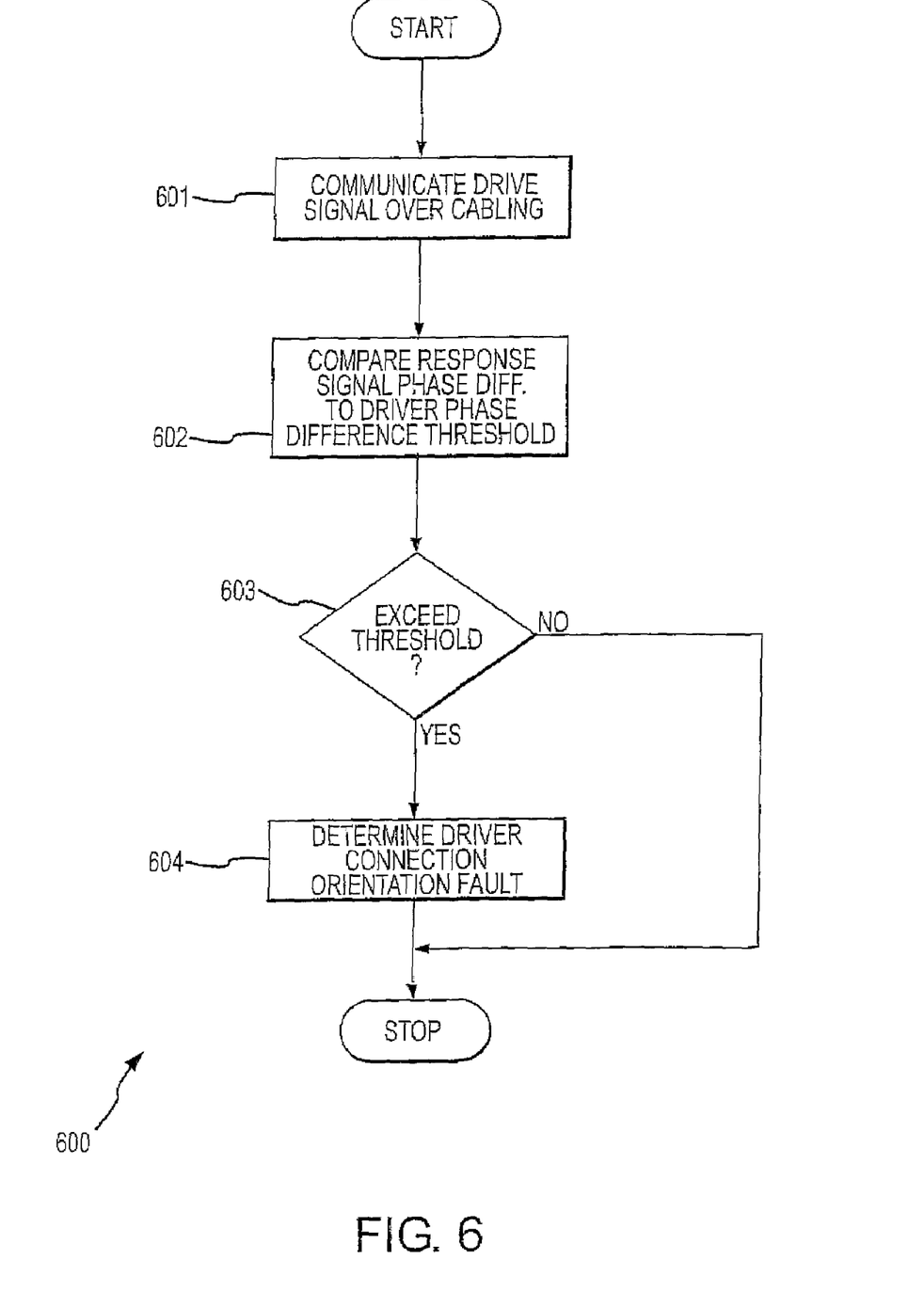
FIG. 6 is a flowchart of a method for detecting a cable fault in a cabling of a flow meter according to an embodiment of the invention.

FIG. 6 is a flowchart 600 of a method for detecting a cable fault in a cabling of a flow meter according to an embodiment of the invention. In this method, a driver connection orientation fault determination is performed.

In step 601, the driver circuit 220 generates a drive signal and communicates the drive signal to the driver 204 via the cabling 205, as previously discussed. As a result, the driver 204 generates a physical excitation in the flow conduits 103A and 103B using the drive signal. Consequently, the signal conditioning circuit 202 receives first and second response signals from the first and second pickoff sensors 201a and 201b via the cabling 205 in response to the vibration of the flow conduits by the driver 204.

In step 602, a response signal phase difference is compared to a predetermined driver phase difference threshold. The response signal phase difference comprises a difference between a response signal phase and a drive signal phase. The drive signal phase is the phase characteristic provided to the driver circuit 220, i.e., it s the drive phase that the driver circuit 220 and the drive 204 are targeted to achieve. The actual phase of the response should be close to the phase, and will typically differ in relation to a mass flow rate of flow material in the flow conduits 103.

In step 603, if the response signal phase difference exceeds the predetermined driver phase difference threshold, then a driver connection orientation fault is determined in the driver wires and the method proceeds to step 604. Otherwise, if the response signal phase difference does not exceed the predetermined driver phase difference threshold, then the driver connection orientation is determined to be correct and the method branches around step 604.

In step 604, because the response signal phase difference exceeded the predetermined driver phase difference threshold, then it is determined that a driver connection orientation fault exists in the driver wires. For example, the phase difference can be around 180 degrees, plus or minus a relatively small phase difference portion caused by a response to a flow material in the flow conduit(s) 103. As before, an alarm condition can be generated if the connection orientation fault is determined to exist. In addition, the meter electronics 20 can invert the drive signal. For example, the drive signal can be inverted before it is sent to the driver 204. In this manner, the improper driver connection orientation can be remediated.

Figure 7:
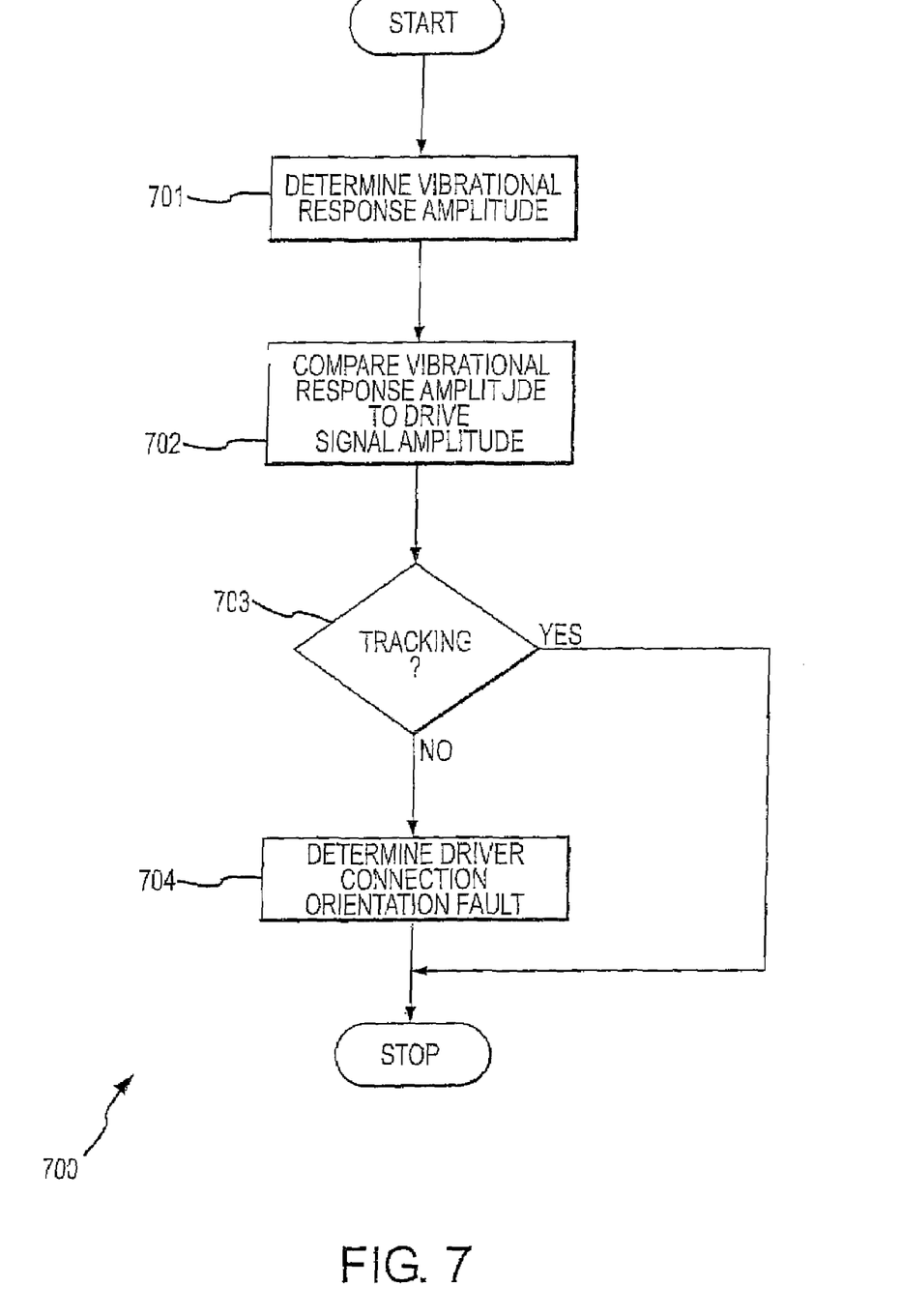
FIG. 7 is a flowchart of a method for detecting a cable fault in a cabling of a flow meter according to an embodiment of the invention.

It should be understood that either method of FIG. 6 or FIG. 7 can be used to make a driver connection orientation fault determination.

FIG. 7 is a flowchart 700 of a method for detecting a cable fault in a cabling of a flow meter according to an embodiment of the invention. In this method, a driver connection orientation fault determination is performed.

In step 701, a vibrational response amplitude is determined. The vibrational response amplitude can comprise an amplitude of a response signal from either pickoff.

In step 702, the vibrational response amplitude is compared to a drive signal amplitude. The comparison can be a comparison of the two amplitudes at one or more instantaneous points in time. Alternatively, the comparison can compare averaged or filtered values, etc.

In step 703, if the vibrational response amplitude is substantially tracking the drive signal amplitude, then the method exits. If the vibrational response amplitude is not substantially tracking the drive signal amplitude, then the method proceeds to step 704.

In step 704, because the vibrational response amplitude is not substantially tracking the drive signal amplitude, then it is determined that a driver connection orientation fault exists in the driver wires. As before, an alarm condition can be generated if the driver connection orientation fault is determined to exist. In addition, the meter electronics 20 can invert the drive signal. For example, the drive signal can be inverted before it is sent to the drive 204. In this manner, the improper driver connection orientation can be remediated.

Figure 8:
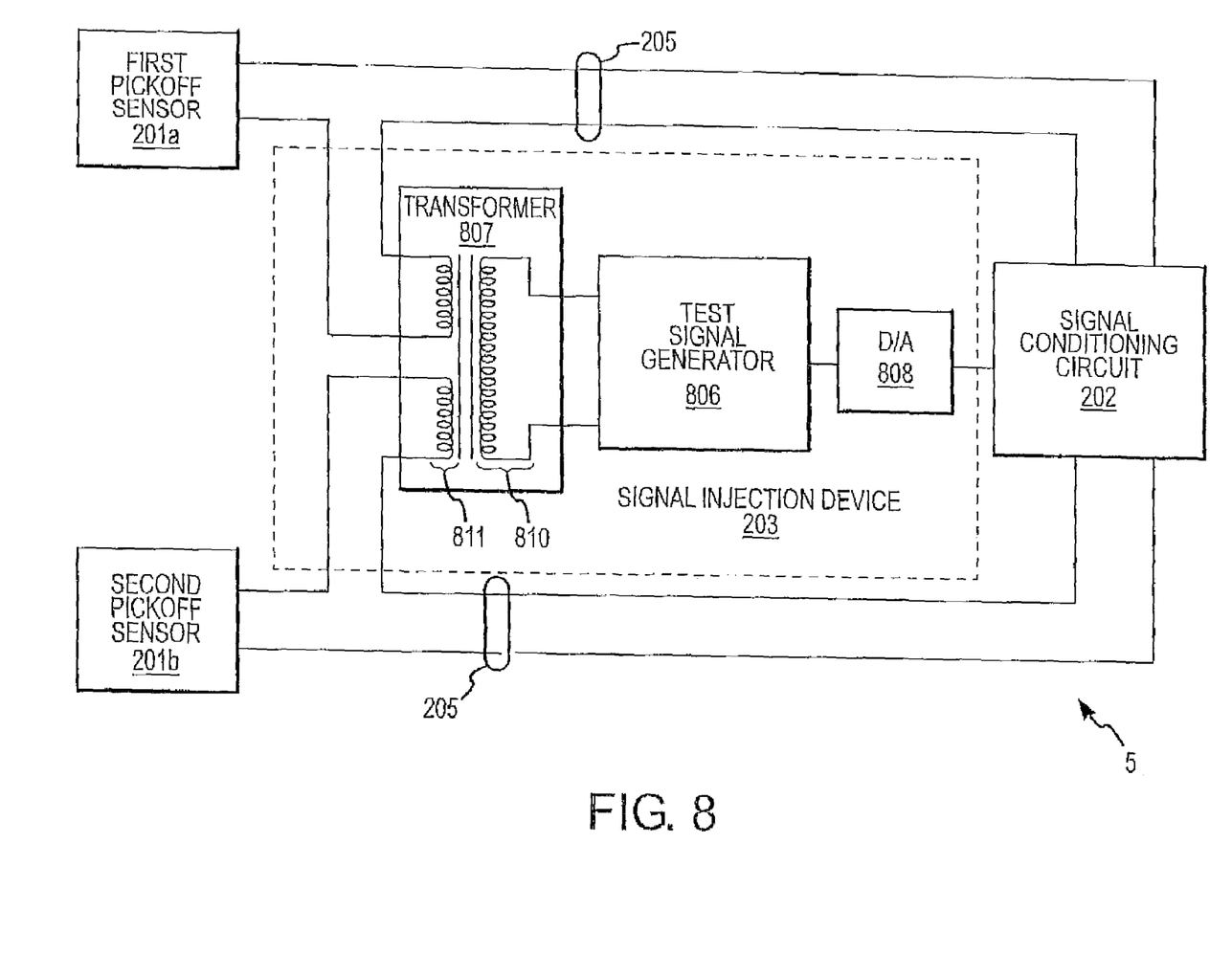
FIG. 8 shows the flow meter according to an embodiment of the invention.

FIG. 8 shows the flow meter 5 according to an embodiment of the invention. Components in common with FIG. 2 share the same reference numbers. In this embodiment, the signal injection device 203 comprises a digital-to-analog (D/A) converter 808, an injection signal generator 806, and a transformer 807. The D/A 808 is connected to the signal conditioning circuit 202 and to the injection signal generator 806. The injection signal generator 806 is further connected to the transformer 807.

The D/A 808 receives a digital frequency command from the signal conditioning circuit 202. The D/A 808 converts the digital frequency command into a frequency input into the injection signal generator 806, wherein the frequency input specifies the frequency of a (single) injection signal to be generated. The injection signal generator 806 generates the injection signal and transmits the injection signal to primary windings 810 of the transformer 807.

The transformer 807 creates the first and second injection signals through the use of a split transformer secondary, wherein the secondary windings 811 of the transformer 807 comprise substantially equal pairs of secondary windings. In this manner, the injection signal at the primary windings 810 of the transformer 807 is converted into the first and second injection signals at the secondary windings 811. The two secondary windings 811 are connected to the cabling 205 and to the first and second pickoff sensors 201a and 201b, wherein signals can be injected into the pickoff sensors. As before, the signal conditioning circuit 202 receives the first and second response signals that are created as a result of the injection of the first and second injection signals.

What is claimed is:

1. A meter electronics (20) for detecting a cable fault in a cabling (205) of a flow meter (5), with the meter electronics (20) including first and second pickoff sensors (201a and 201b) and the cabling (205) coupled to the first and second pickoff sensors (201a, 201b) and including one or more first pickoff wires and one or more second pickoff wires, with the meter electronics (20) being characterized by:

a signal injection device (203) coupled to the cabling (205), with the signal injection device (203) being configured to generate an injection signal and communicate the injection signal into the cabling (205) and to the first and second pickoff sensors (201a, 201b); and a signal conditioning circuit (202) coupled to the cabling (205), with the signal conditioning circuit (202) being configured to receive at least one response signal from at least one of the first and second pickoff sensors (201a, 201b) in response to the injection signal and determine one or more of a pickoff open wire fault and a pickoff connection orientation fault in one or both of the one or more first pickoff wires and the one or more second pickoff wires of the cabling (205).

2. The meter electronics (20) of claim 1, with the signal conditioning circuit (202) being configured to compare an injection signal component of the at least one response signal to a predetermined pickoff amplitude threshold and determine a pickoff open wire fault in the corresponding one or more first pickoff wires or in the corresponding one or more second pickoff wires if the injection signal component does not exceed the predetermined pickoff amplitude threshold.

3. The meter electronics (20) of claim 1, with the signal conditioning circuit (202) receiving a first pickoff response signal and a second pickoff response signal and with the signal conditioning circuit (202) being configured to compare a phase difference between a first pickoff response phase and a second pickoff response phase to a predetermined pickoff phase difference threshold and determine a pickoff connection orientation fault in the corresponding one or more first pickoff wires or in the corresponding one or more second pickoff wires if the phase difference exceeds the predetermined pickoff phase difference threshold.

4. The meter electronics (20) of claim 1, with the signal injection device (203) comprising:

a digital-to-analog (D/A) converter (708) configured to receive a digital frequency command and output a frequency input;

an injection signal generator (706) that receives the frequency input from the D/A converter (708) and outputs an injection signal of a frequency specified by the frequency input; and a transformer (707) that communicates the injection signal into the cabling (205).

5. The meter electronics (20) of claim 1, wherein the signal conditioning circuit (202) is further configured to invert a received response signal from one pickoff sensor (201) if a pickoff connection orientation fault is determined to exist.

6. A method for detecting a cable fault in a cabling of a flow meter, the method being characterized by:

in a meter electronics, comparing an injection signal component of a response signal received in the meter electronics from at least one of a first pickoff sensor and a second pickoff sensor to a predetermined pickoff amplitude threshold; and in the meter electronics, determining a pickoff open wire fault in a corresponding one or more first pickoff wires or in a corresponding one or more second pickoff wires if the injection signal component does not exceed the predetermined pickoff amplitude threshold.

7. The method of claim 6, further comprising generating an alarm if the pickoff open wire fault is determined to exist.

8. The method of claim 6, with the comparing and determining further comprising:

comparing a first injection signal component of a first response signal from the first pickoff sensor to the predetermined pickoff amplitude threshold;

determining a first pickoff open wire fault in the one or more first pickoff wires if the first injection signal component does not exceed the predetermined pickoff amplitude threshold;

comparing a second injection signal component of a second response signal from the second pickoff sensor to the predetermined pickoff amplitude threshold; and determining a second pickoff open wire fault in the one or more second pickoff wires if the second injection signal component does not exceed the predetermined pickoff amplitude threshold.

9. A method for detecting a cable fault in a cabling of a flow meter, the method being characterized by:

in a meter electronics, comparing a phase difference between a first pickoff response phase of a first pickoff response signal and a second pickoff response phase of a second pickoff response signal to a predetermined pickoff phase difference threshold, with the first pickoff response signal and the second pickoff response signal being received in the meter electronics from the first pickoff sensor and the second pickoff sensor via the cabling; and in the meter electronics, determining a pickoff connection orientation fault if the phase difference exceeds the predetermined pickoff phase difference threshold.

10. The method of claim 9, further comprising generating an alarm if the pickoff connection orientation fault is determined to exist.

11. The method of claim 9, further comprising, after the determining, inverting a received response signal from one pickoff sensor if a pickoff connection orientation fault is determined to exist.

* * * * *